(12) United States Patent
Jung et al.

(10) Patent No.: US 9,487,412 B2
(45) Date of Patent: *Nov. 8, 2016

(54) SYSTEM AND METHOD FOR REMEDIATING CONTAMINATED SOIL BY SEPARATION OF HIGHLY CONTAMINATED COARSE SOIL

(75) Inventors: Jungyo Jung, Seoul (KR); Wan Hyup Kang, Yongin-si (KR); Kangsuk Kim, Seoul (KR); Junghee Chang, Seoul (KR)

(73) Assignee: HYUNDAI ENGINEERING & CONSTRUCTION CO., LTD., Seoul (KR)

(*) Notice: Subject to any disclaimer, the term of this patent is extended or adjusted under 35 U.S.C. 154(b) by 111 days.

This patent is subject to a terminal disclaimer.

(21) Appl. No.: 14/357,076

(22) PCT Filed: Mar. 28, 2012

(86) PCT No.: PCT/KR2012/002247
§ 371 (c)(1),
(2), (4) Date: May 8, 2014

(87) PCT Pub. No.: WO2013/069853
PCT Pub. Date: May 16, 2013

(65) Prior Publication Data
US 2014/0321916 A1    Oct. 30, 2014

(30) Foreign Application Priority Data

Nov. 10, 2011 (KR) .......... 10-2011-0116871

(51) Int. Cl.
*B09C 1/02* (2006.01)
*C02F 1/00* (2006.01)
(Continued)

(52) U.S. Cl.
CPC . *C02F 1/00* (2013.01); *B07B 1/04* (2013.01); *B07B 13/04* (2013.01); *B09C 1/02* (2013.01);
(Continued)

(58) Field of Classification Search
USPC .............................. 405/128.1, 128.7, 128.75
See application file for complete search history.

(56) References Cited

U.S. PATENT DOCUMENTS

| | | | |
|---|---|---|---|
| 6,120,579 A * | 9/2000 | El-Shoubary | B09C 1/02 423/109 |
| 2009/0084731 A1* | 4/2009 | Talley | B01J 20/0229 210/684 |
| 2014/0345649 A1* | 11/2014 | Jung | B09C 1/02 134/13 |

FOREIGN PATENT DOCUMENTS

| | | | |
|---|---|---|---|
| JP | 2000-167432 A | | 6/2000 |
| JP | 2002210451 | * | 7/2002 |

(Continued)

OTHER PUBLICATIONS

Korean Intellectual Property Office / ISA, International Search Report and Written Opinion of the International Searching Authority issued on Patent Application No. PCT/KR2012/002247 on Oct. 29, 2012.

*Primary Examiner* — Sean Andrish
(74) *Attorney, Agent, or Firm* — Perkins IP Law Group LLC; Jefferson Perkins (57) ABSTRACT

The present invention relates to a system and method for remediating contaminated soil through separation and process of highly contaminated coarse soil, the system including: a screen adapted to separate the contaminated soil introduced into soil having given particle sizes; multiple hydrocyclones adapted to re-separate the soil having particle sizes of more than the given values by particle size from the soil having the given particle sizes separated through the screen; a remediating unit adapted to wash the soil separated through the multiple hydrocyclones by particle size; and a filtering unit adapted to separate water from the soil washed through the remediating unit.

6 Claims, 6 Drawing Sheets

(51) Int. Cl.
  *B07B 13/04* (2006.01)
  *B07B 1/04* (2006.01)
  *C02F 1/28* (2006.01)
  *B07B 1/40* (2006.01)
  *C02F 101/10* (2006.01)
  *C02F 101/20* (2006.01)
(52) U.S. Cl.
  CPC .. *C02F 1/28* (2013.01); *B07B 1/40* (2013.01); *C02F 2101/103* (2013.01); *C02F 2101/20* (2013.01)

(56) References Cited

FOREIGN PATENT DOCUMENTS

| | | |
|---|---|---|
| KR | 1020030005713 A | 1/2003 |
| KR | 1020030072144 A | 9/2003 |
| KR | 1020050081622 A | 8/2005 |
| KR | 100639042 B1 | 10/2006 |
| KR | 100958067 B1 | 5/2010 |
| KR | 1020100102771 A | 9/2010 |

* cited by examiner

SYSTEM AND METHOD FOR REMEDIATING CONTAMINATED SOIL BY SEPARATION OF HIGHLY CONTAMINATED COARSE SOIL

TECHNICAL FIELD

The present invention relates to a system and method for remediating contaminated soil which selectively separates and remediates highly contaminated soil having given particle sizes from the heavy metals-contaminated soil, and more particularly, to a system and method for remediating contaminated soil through separation and process of highly contaminated coarse soil which performs the separation and remediation for the highly contaminated coarse soil in which a large amount of fine soil is contained.

BACKGROUND ART

Generally, soil contamination is caused by falling and permeation of contaminants in soil, and with the development of the industry, soil becomes seriously contaminated with hazardous substances like smoke and waste water discharged from plants. Above all, the soil is very seriously contaminated with heavy metals generated around plants. The soil contaminated with arsenic (As) in the heavy metals is mainly found on waste mine or smelter regions, and for example, if the smelter is a contamination cause, the contamination of the soil with arsenic emitted from the chimney of the smelter occurs within a radius of 2 km around the smelter.

Figure 1:
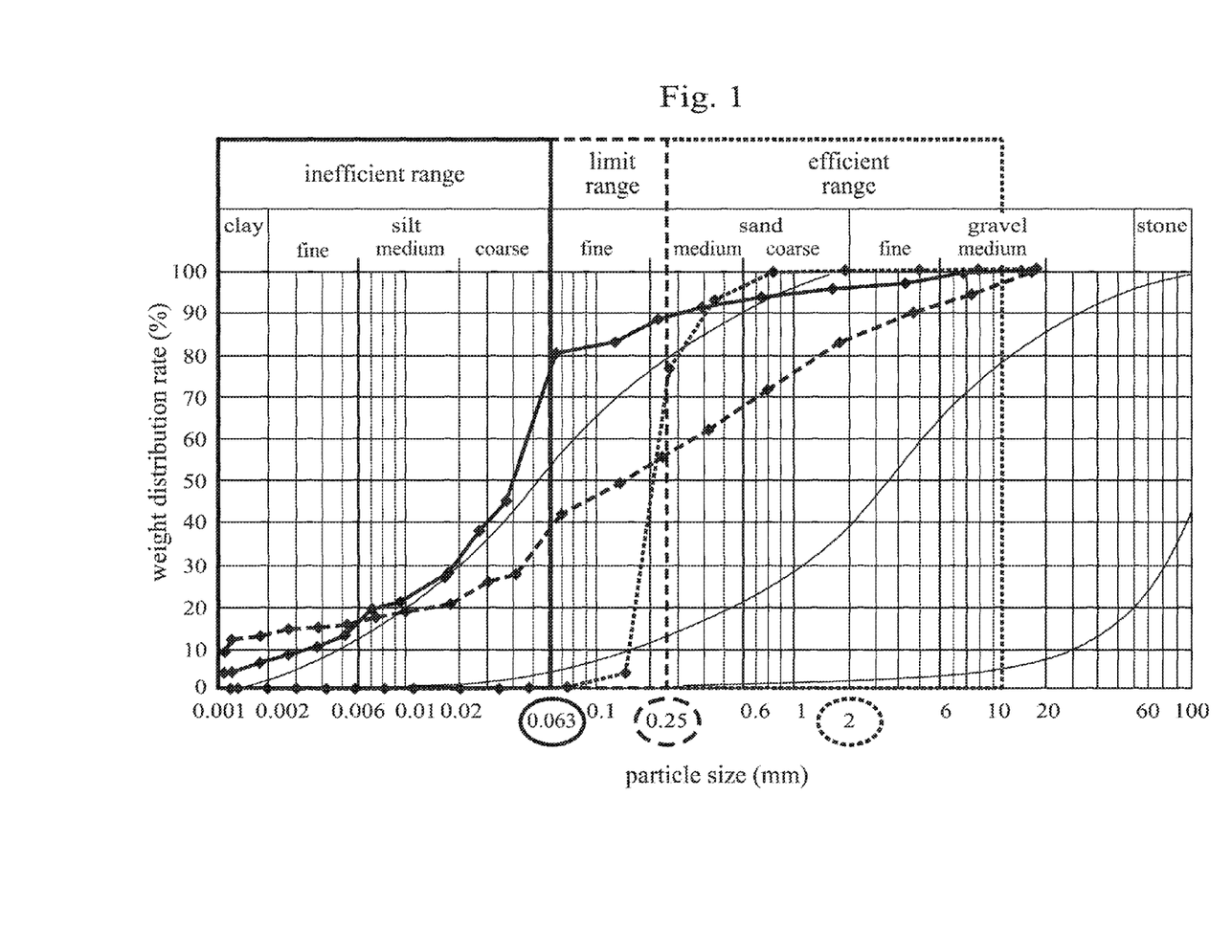
FIG. 1 is a graph showing general soil remediation efficiencies in accordance with the particle sizes of soil.

In this case, referring to FIG. 1 showing general soil remediation efficiencies in accordance with the particle sizes of soil, soil is separated into coarse soil such as gravel and stone having particle sizes of more than 2 mm, medium soil such as sand having particle sizes between 0.075 mm and 2 mm, and fine soil such as silt and clay having particle sizes of less than 0.075 mm. If the coarse soil, the medium soil and the fine soil are remediated, in view of the remediation cost and time efficiency, the coarse soil is within a substantially economical range, the fine soil is within inefficient economical range, and the medium soil is within intermediate economical range.

Conventional systems for remediating the contaminated soil are configured wherein contaminated soil collected is introduced and remediated into a washing device.

One example of such washing devices is disclosed in Korean Patent Laid-Open Application No. 2003-0005713 (dated on Jan. 23, 2003) wherein the soil washing device includes a pre-washing tank and a main washing tank by which the contaminated soil can be repeatedly washed.

Further, the conventional soil washing device is configured wherein the contaminated soil is collected and poured into a mixing tank for remediation.

However, disadvantageously, the conventional soil washing device just performs the remediation of all of the contaminated soil, irrespective of soil properties and the soil contamination degrees caused by the soil properties, that is, irrespective of the differences of the particle sizes of soil on a paddy field, farm, seaside and mountain range and the contamination degrees of the soil by particle size, thereby showing low efficiencies in remediation work.

DISCLOSURE OF INVENTION

Technical Problem

Accordingly, the present invention has been made in view of the above-mentioned problems occurring in the prior art, and it is an object of the present invention to provide a system and method for remediating contaminated soil through separation and process of highly contaminated coarse soil which performs the separation and remediation for the highly contaminated soil having given particle sizes from the soil having different contamination degrees in accordance with the properties of soil and contaminants, and especially which performs the separation and remediation for the highly contaminated coarse soil in which a large amount of fine soil is contained.

Solution to Problem

To accomplish the above object, according to a first aspect of the present invention, there is provided a system for remediating contaminated soil through separation and process of highly contaminated coarse soil, the system including: a screen adapted to separate the contaminated soil introduced into soil having given particle sizes; multiple hydrocyclones adapted to re-separate the soil having particle sizes of more than the given values by particle size from the soil having the given particle sizes separated through the screen; a remediating unit adapted to wash the soil separated through the multiple hydrocyclones by particle size; and a filtering unit adapted to separate water from the soil washed through the remediating unit.

According to the present invention, preferably, the screen includes a wet vibration screen and separates the soil into soil like gravel and sand having particle sizes of more than 0.060 mm to 0.075 mm and fine soil like silt having particle sizes of less than 0.060 mm to 0.075 mm, and the soil separated through the screen is paddy field soil.

According to the present invention, preferably, the size and number of hydrocyclones are determined upon the particle size ranges of the soil to be separated and the differences between the particle size ranges. That is, one or two or more hydrocyclones are installed and operated, and in this case, the multiple hydrocyclones are adapted to re-separate the soil having desired particle size ranges from the soil having the particle sizes of more than or less than the given particle sizes separated through the screen, which are varied in installation in accordance with the contamination degrees of the soil by particle size.

According to the present invention, preferably, the remediating unit includes a mixing tank in which the soil having particle sizes having high contamination concentrations is introduced and washed by process water for washing in which acid solution inclusive of $H_3PO_4$ is contained to perform the elution of the contaminants of the soil.

According to the present invention, preferably, the filtering unit is adapted to discharge the process water for washing from the soil conveyed through a belt filter by means of vacuum.

According to the present invention, preferably, the soil remediation system further includes a process water for washing-recycling unit adapted to absorb the contaminants of the process water for washing introduced from the filtering unit and to recycle the process water for washing.

According to the present invention, preferably, the process water for washing-recycling unit includes an absorber onto which the contaminants inclusive of arsenic, lead and the like in the process water for washing are absorbed.

To accomplish the above object, according to a second aspect of the present invention, there is provided a method for remediating contaminated soil through separation and process of highly contaminated coarse soil, the method including the steps of: performing a collecting step wherein contaminated soil is collected; performing a separating step wherein the contamination soil collected through the collecting step is separated and discharged into soil having particle sizes of given values; performing a re-separating step wherein the soil having the particle sizes of more than the given values from the soil having particle sizes of the given values separated in the separating step is re-separated and discharged; performing a remediating step wherein the soil in the separated soil through the re-separating step is washed through process water for washing; and performing a filtering step wherein the remediated soil introduced from the remediating step and the process water for washing contained in the remediated soil are separately discharged from each other.

According to the present invention, preferably, the soil having the particle sizes of less than the given value separated in the separating step is conveyed to a water treatment unit together with wash water, and the soil having the particle sizes of more than the given particle sizes separated in the re-separating step is discharged to the remediating step. In this case, the water treatment unit is adapted to separate the soil having the particle sizes of less than the given value from the wash water through coagulating and settling and to discharge the wash water to the process water storage tank.

According to the present invention, preferably, in the remediating step the contaminants of the soil introduced from the re-separating step is eluted through the process water for washing in which acid solution inclusive of $H_3PO_4$ is contained.

To accomplish the above object, according to a third aspect of the present invention, there is provided a method for remediating contaminated soil through separation and process of highly contaminated coarse soil, the method including the steps of: performing a collecting step wherein contaminated soil is collected; performing a separating step wherein the contamination soil collected through the collecting step is separated and discharged into soil having particle sizes of given values; performing a re-separating step wherein the soil having the particle sizes of more than the given values from the soil having particle sizes of the given values separated in the separating step is re-separated and discharged; performing a remediating step wherein the contaminants of the soil introduced through the re-separating step are eluted through process water for washing in which acid solution inclusive of $H_3PO_4$ is contained; performing a filtering step wherein the remediated soil introduced from the remediating step and the process water for washing contained in the remediated soil are separately discharged from each other; and performing a purifying and returning step wherein the process water for washing separated through the filtering step is collected and purified and the purified water is conveyed to the separating step.

According to the present invention, preferably, in the purifying and returning step the heavy metals-contaminants inclusive of arsenic and lead contained in the process water for washing are absorbed.

Advantageous Effects of Invention

According to the present invention, the highly contaminated soil is separated by particle size in accordance with soil properties, and thus, the remediation is intensively performed for the soil by particle size, such that the present invention can perform more effective remediation than the conventional practices.

In addition, unlike the conventional practices wherein all of the contaminated soil is remediated, the present invention can perform the remediation only for the highly contaminated soil having the given particle sizes, thereby reducing the cost and time consumed for the remediation of the contaminated soil.

MODE FOR THE INVENTION

Hereinafter, an explanation on a system for remediating contaminated soil through separation and process of highly contaminated coarse soil according to the present invention will be in detail given with reference to the attached drawings.

Configuration

Figure 2:
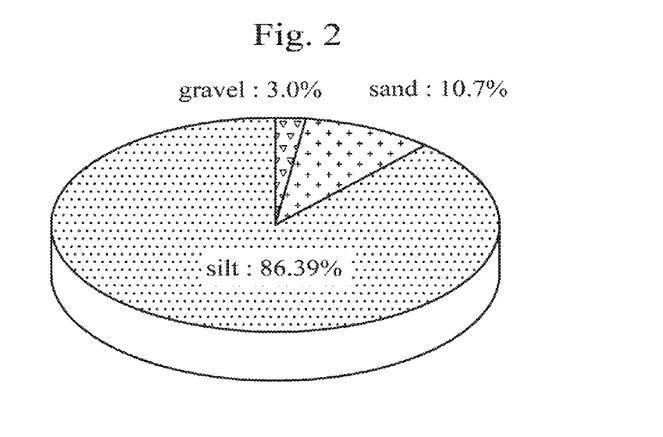
FIG. 2 is a graph showing particle size distribution of paddy field soil to which a system for remediating contaminated soil through separation and process of highly contaminated coarse soil according to the present invention is applied.
Figure 3:
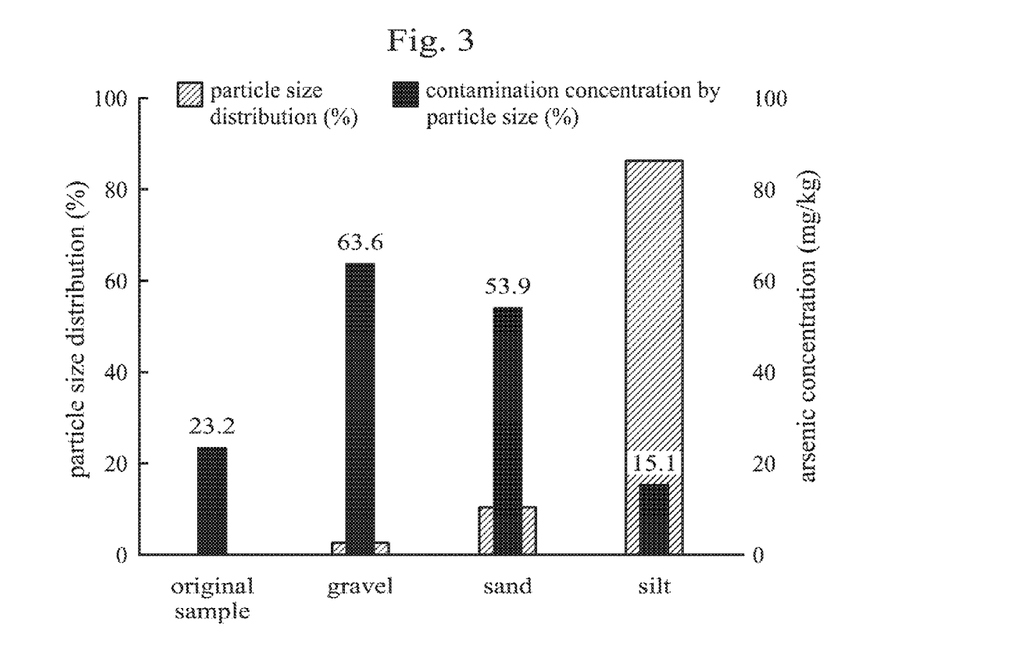
FIG. 3 is graphs showing the analysis of the arsenic contamination concentrations by the particle size of the paddy field soil in FIG. 2.
Figure 4:
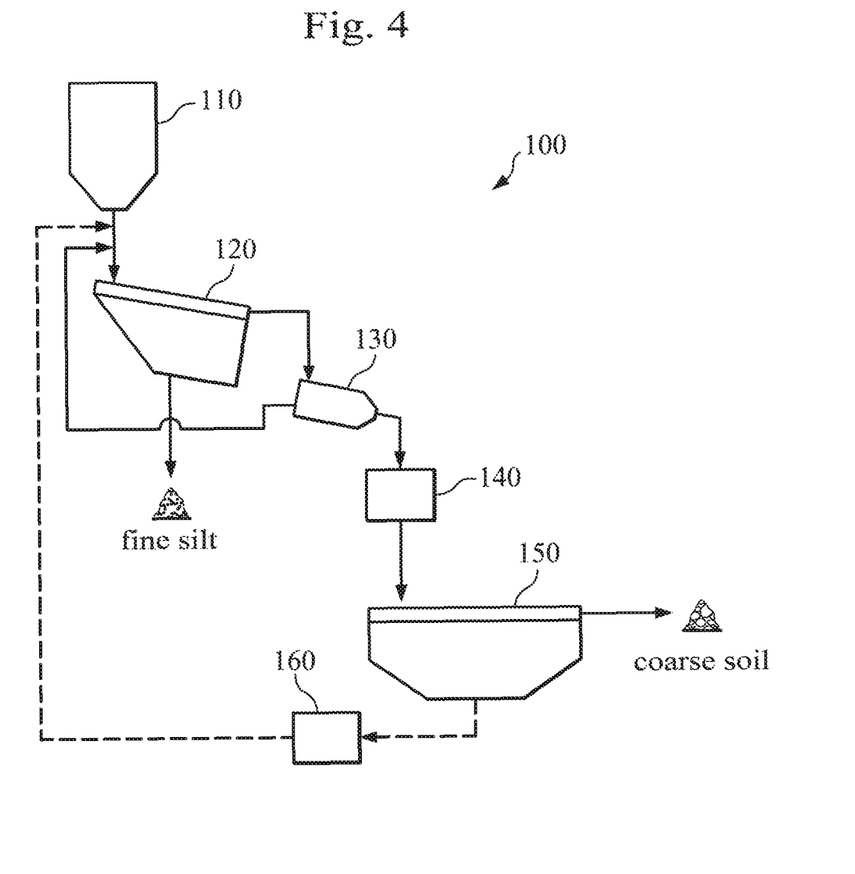
FIGS. 4 and 5 are a schematic view and a block diagram showing a system for remediating contaminated soil through separation and process of highly contaminated coarse soil according to the present invention.
Figure 5:
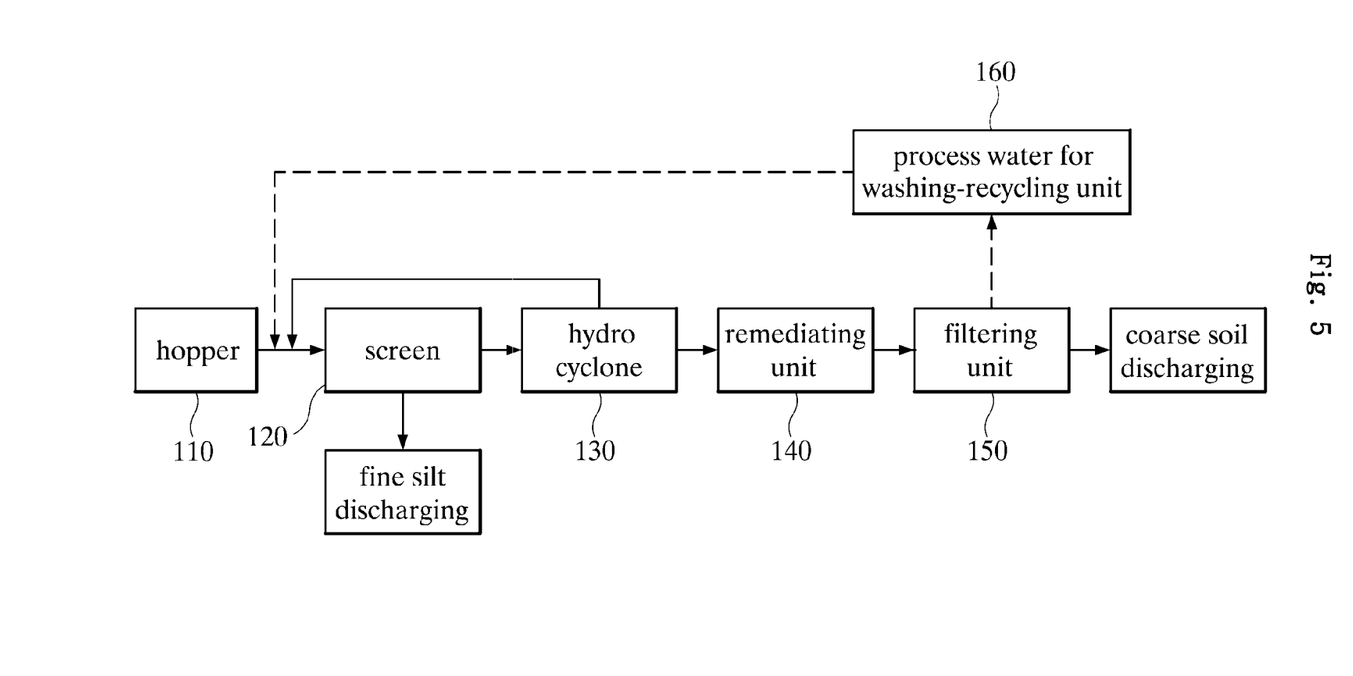
Figure 6:
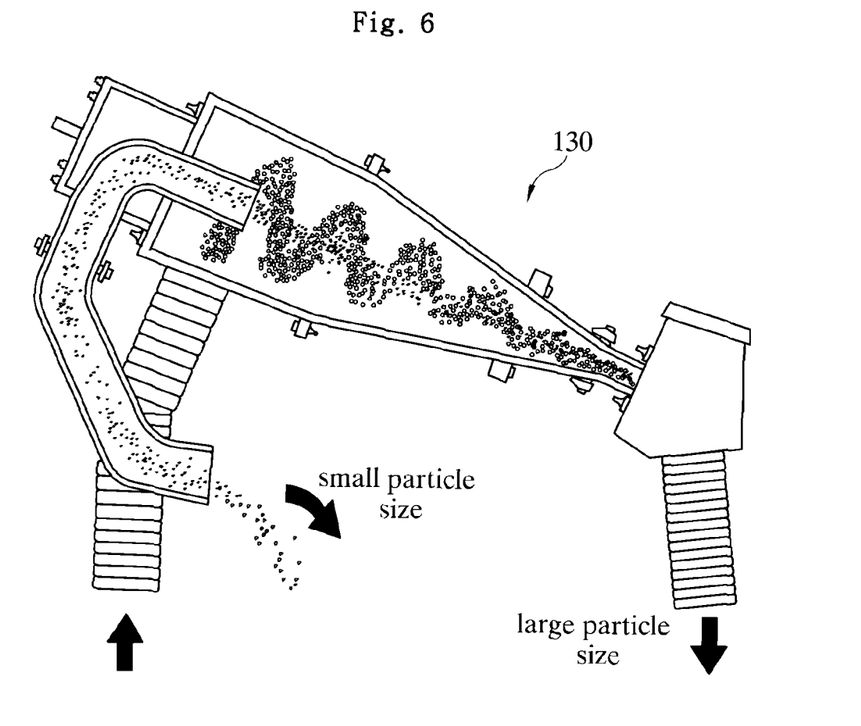
FIG. 6 is a side sectional view showing an operating state of the hydrocyclone in FIG. 4.

FIG. 2 is a graph showing particle size distribution of paddy field soil to which a system for remediating contaminated soil through separation and process of highly contaminated coarse soil according to the present invention is applied, FIG. 3 is graphs showing the analysis of the arsenic contamination concentrations by the particle size of the paddy field soil in FIG. 2, FIGS. 4 and 5 are a schematic view and a block diagram showing a system for remediating contaminated soil through separation and process of highly contaminated coarse soil according to the present invention, and FIG. 6 is a side sectional view showing an operating state of the hydrocyclone in FIG. 4.

According to the present invention, first, a system 100 for remediating contaminated soil through separation and process of highly contaminated coarse soil is provided to remediate contaminated soil, especially, the soil in specific areas around plants like steel mills, smelters and so on which is seriously contaminated with contaminants discharged from the plants. In this case, the soil near the smelter area is best in the contamination degree, and at this time, the range of the soil needed to be remediated is within a radius of 2 km around the smelter area. The contaminants contained in the contaminated soil include arsenic (As) as a main contaminant, zinc (Zn), copper (Cu), lead (Pb), cadmium (Cd), nickel (Ni), and the like.

So as to collect the information on the design of the system 100 according to the present invention, on the other hand, the paddy field (forest and field) soil around a specific smelter was separated by particle size into silt of 86.3%, sand of 10.7%, and gravel of 3.0%, as shown in FIG. 2. Referring also to the heavy metals-contaminated properties by particle size of the soil separated by particle size, as shown in FIG. 3, the bigger the particle size of the soil is, the higher the cumulative contamination degree is. Especially, as shown in FIG. 3, arsenic is highest in the contamination concentration in the gravel and sand, and the above-mentioned description is summarized with Table 1.

TABLE 1

| Particle size (mm) | Particle size distribution (%) | Arsenic Concentration by particle size (mg/kg) |
|---|---|---|
| Original Sample | | 23.22 |
| Gravel (more than 2.0) | 2.97 | 63.55 |
| Sand (between 0.075~2.0) | 10.70 | 53.85 |
| Silt (less than 0.075) | 86.33 | 15.07 |
| Total | 100 | |

Like this, it could be appreciated that the contamination concentrations of the paddy field soil by arsenic become high in the gravel and sand. In this case, the paddy field soil for which the contamination concentrations by arsenic are tested is randomly collected from the region within a radius of 2 km around the smelter area. Referring to the contamination standards of arsenic as suggested under Asterisk No. 3 of Paragraph 1 of Article 13 of the Soil Environment Conservation Act, on the other hand, a first area has arsenic of 25 mg/kg and a second area has arsenic of 50 mg/kg. Based on the contamination standards of arsenic, as shown in FIG. 3, a remediation standard for the contamination concentration of the paddy field soil as the first area in the present invention is set to arsenic of 75 mg/kg, and at this time, the soil having the particle sizes of more than 0.060 mm to 0.075 mm is selected on the basis of the remediation standard. Through the remediation of the soil having the particle sizes of more than 0.060 mm to 0.075 mm, the standards suggested in the Soil Environment Conservation Act are generally satisfied.

The soil remediation system 100 according to the present invention made with the above-mentioned data largely includes a hopper 110, a screen 120, a hydrocyclone 130, a remediating unit 140, a filtering unit 150 and a process water for washing-recycling unit 160.

In this case, the hopper 110 is adapted to store the contaminated paddy field soil collected around a smelter region and to supply the contaminated soil to the screen 120.

The screen 120 is adapted to separate the soil introduced from the hopper 110 on the standard of the particle sizes ranging from 0.060 mm to 0.075 mm. The soil like gravel and sand having the particle sizes of more than 0.060 mm to 0.075 mm from the separated soil through the screen 120 is conveyed to the hydrocyclone 130, and the soil having the particle sizes of less than 0.060 mm to 0.075 mm is separately discharged. Of course, the particle sizes of the soil can be varied in accordance with the kinds of the separated soil, the contamination degrees of the soil, and other conditions. At this time, the hydrocyclone can be installed plurally to separate the soil in two or more particle size units. For example, the soil may be separated in the particle sizes of 0.040 mm or 0.020 mm. In this case, the screen 120 includes a wet vibration screen used as an existing screen. The weights, water contents and arsenic concentrations of the gravel, sand and silt discharged through the screen 120 from the totally introduced paddy field soil are listed by the following Table 2. At this time, 3 tons are introduced from the total allowance introduction amount of 6 tons, and the whole arsenic concentration is 28.5 mg/kg.

TABLE 2

| Particle size (mm) | Gravel (more than 2.0) | Sand (between 0.075~2.0) | Silt (less than 0.075) |
|---|---|---|---|
| Soil (ton) | 0.09 | 0.32 | |
| Water content (%) | ±10 | ±15 | ±25 |
| Arsenic Concentration (mg/kg) | 72.0 | 174.7 | 11.6 |

(This data is based on the estimation for the field experiments conducted by Korea Environment Corporation on Dec. 22, 2010).

If the coarse soil mainly containing gravel and sand having the particle sizes of more than 0.060 mm to 0.075 mm separated from the screen 120 is introduced to the hydrocyclone 130, the hydrocyclone 130 re-separates the soil into the coarse soil having the particle sizes of more than 0.060 mm to 0.075 mm and the fine soil except the coarse soil. In this case, as shown in FIG. 6, the hydrocyclone 130 is configured to discharge light soil having small particle sizes through an upper side separate pipe and to discharge heavy soil having large particle sizes through a lower side separate pipe in accordance with the separation standards of the soil introduced thereto. The hydrocyclone 130 is installed to perform fine separation for the soil having smaller particle sizes than the soil separated through general cyclones. According to the present invention, one hydrocyclone is provided, but so as to perform finer separation, one or more hydrocyclones may be installed. The particle size units to be separated may be varied in accordance with the kinds of the separated soil, the contamination degrees of the soil, and other conditions, and also, the number of hydrocyclones installed may be varied in accordance with the variation of the particle size units. Further, three or more hydrocyclones may be installed, and among them, one or two hydrocyclones may be operated in accordance with particle size units. At this time, if the multiple hydrocyclones may be installed, they are connected serially to each other. If one hydrocyclone 130 is installed, soil having the particle sizes of less than 0.060 mm to 0.075 mm is introduced again to the screen 120, and the soil having the particle sizes of more than 0.060 mm to 0.075 mm is conveyed to the remediating unit 140. If three hydrocyclones are installed, the soil is separated into the soil having the particle sizes of more than and less than 0.060 mm to 0.075 mm, more than and less than 0.040 mm, and more than and less than 0.020 mm. In this case, the number of multiple hydrocylones to be operated is determined upon the particle size units separated by the contamination degrees of the soil. At this time, the soil separated through the multiple hydrocyclones is separated and conveyed consequentially in the order from large particle sizes to small particle sizes. Also, the soil having the particle sizes less than the standard value is introduced again to the screen 120, and the soil having the particle sizes more than the standard value is conveyed to the remediating unit 140. At this time, if the particle size units are multiple, each soil is conveyed to the remediating unit corresponding thereto.

The remediating unit 140 is adapted to wash the soil introduced in a state of being separated by particle size from the hydrocyclone 130. Of course, desirably, the number of remediating units is determined upon the number of hydrocyclones installed and operated. In this case, the remediating unit 140 makes use of acid so as to intensively remediate the contaminants inclusive arsenic and lead, and in more detail, the acid and the soil are mixed through the remediating unit 140, thereby remediating the contaminated soil with arsenic and lead. In this case, the acid is effective in the remediation of arsenic and lead-contaminated soil, and at this time, $H_3PO_4$ is economical in use. Object soil is subjected to jar testing for three minutes in the solution made by diluting $H_3PO_4$ to 100 times, and as a result, about 50% of the contaminants of the original sample are removed as shown in Table 3. At this time, the object soil is sand, and the unit is mg/kg.

TABLE 3

| Sand | Arsenic | Zinc | Copper | Lead | Cadmium | Nickel |
|---|---|---|---|---|---|---|
| Original sample | 53.85 | 44.758 | 45.44 | 110.02 | 0.67 | 26.89 |
| Acid treated soil | 31.97 | 34.74 | 26.56 | 76.76 | 0.03 | 23.36 |

In this case, the remediating unit 140 includes a mixing tank in which the soil having particle sizes of more than 0.060 mm to 0.075 mm from the hydrocyclone 130 is introduced and washed by process water for washing in which acid solution inclusive of $H_3PO_4$ is contained to perform the acid washing for the contaminants of the soil. In this case, one remediating unit 140 may have a plurality of mixing tanks in accordance with the separated particle size units of the soil. If two or more multiple hydrocyclones are installed, the number of remediating units installed is increased such that the soil by particle size units separated through the multiple hydrocyclones is introduced and washed to the respective remediating units. At this time, since the particle size contamination concentrations of the soil introduced from the respective remediating units are different from each other, the amounts and concentrations of $H_3PO_4$ introduced into the respective remediating units are also differently set. In this case, the remediating unit 140 is adapted to measure the contamination concentrations of the process water for washing thereinto so as to adjust an amount of $H_3PO_4$ introduced thereto.

The filtering unit 150 is adapted to pass the acid-washed soil in the remediating unit 140 located on a belt filter thereof through the belt filter with water by means of vacuum and to discharge the soil downwardly. At this time, the process water for washing being conveyed together with the soil by means of the vacuum state formed by the belt filter moving continuously is discharged to the lower side. At this time, the soil separated from the filtering unit 150 is separately stacked to refill the area from which the contaminated soil is collected or is thrown on a separate place. Also, the process water for washing separated from the soil is collected and supplied to the process water for washing-recycling unit 160.

The process water for washing-recycling unit 160 serves to collect and purify the process water for washing discharged from the filtering unit 150 and to move the purified water to a storage tank in which the process water for washing is stored. At this time, the process water for washing-recycling unit 160 is adapted to absorb the contaminants inclusive of arsenic and lead contained in the process water for washing thereonto. Also, the process water for washing-recycling unit 160 is disposed to supply the purified process water for washing to the screen 120 again.

Of course, the process water for washing separated from the soil having the particle sizes of less than the given value discharged from the hydrocyclone 130 may be purified through the process water for washing-recycling unit 160 and stored in the storage tank, and after that, the purified water is then introduced again to the screen 120.

Figure 7:
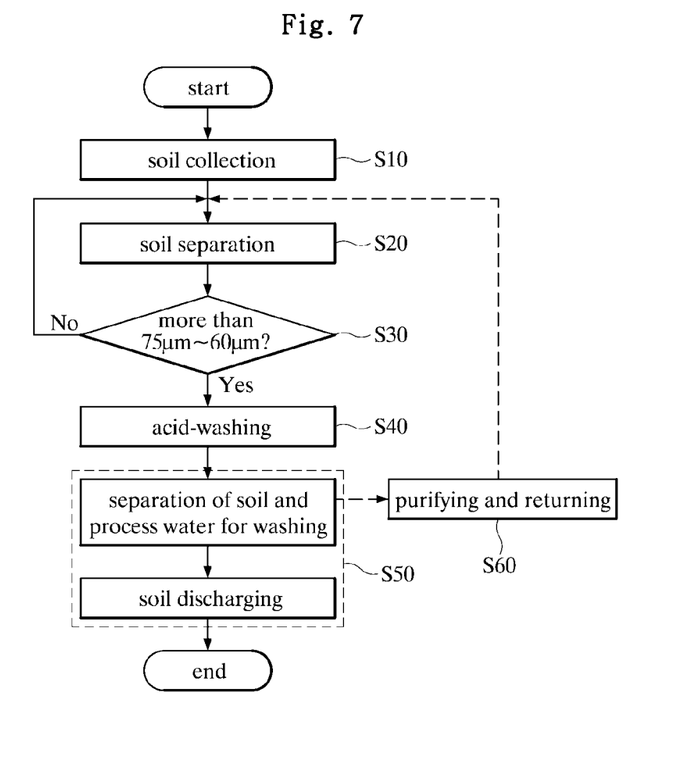
FIG. 7 is a flow chart showing a method for remediating contaminated soil using the system of FIG. 4.

On the other hand, the dotted arrows in FIG. 4, FIG. 5 and FIG. 7 denote the moving paths of only the process water for washing, and the solid arrows therein denote the moving paths of the soil containing water or the process water for washing therein.

Method

Figure 8:
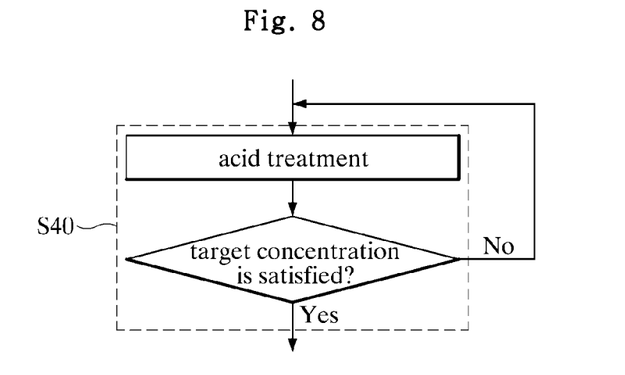
FIG. 8 is a flow chart showing a process for remediating the soil in FIG. 7.

FIG. 7 is a flow chart showing a method for remediating contaminated soil using the soil remediation system of FIG. 4, and FIG. 8 is a flow chart showing a process for remediating the soil in FIG. 7. According to the present invention, the soil is separated into the soil having the particle sizes of more than and less than 0.060 mm to 0.075 mm, but if necessary, the soil may be separated into the soil having the particle sizes of more than and less than 0.040 mm, 0.020 mm, and other values.

As shown in FIG. 7, the method for remediating contaminated soil according to the present invention will be in detail described hereinafter. First, the contaminated soil is collected (at step S10). Especially, the soil is collected from the contaminated soil existing on a depth of about 1 m within a radius of 2 km around a plant.

Next, the collected soil is supplied through the hopper 110 to the screen 120, and through the screen 120, the soil is separated into the soil having given particle sizes (at step S20). At this time, the screen 120 includes the wet vibration screen, and the soil is separated into the coarse soil like gravel and sand having particle sizes of more than 0.060 mm to 0.075 mm and the fine soil like silt having particle sizes of less than 0.060 mm to 0.075 mm.

After that, the soil containing the coarse soil having particle sizes of more than 0.060 mm to 0.075 mm separated by the screen 120 is re-separated through the hydrocyclone 130 (at step S30). At this time, one or more hydrocyclone 130 are installed in accordance with the separated particle size units. According to the present invention, since the soil is separated into the soil having particle sizes of more than 0.060 mm to 0.075 mm and the soil having particle sizes of less than 0.060 mm to 0.075 mm, one hydrocyclone 130 is provided. Through the hydrocyclone 130, the soil having the particle sizes of less than 0.060 mm to 0.075 mm is conveyed for the coagulating and settling treatment and the process water for washing discharged together with the soil is purified and conveyed to the process water for washing storage tank. Further, the soil having particle sizes of more than 0.060 mm to 0.075 mm is conveyed to the remediating unit 140. At this time, the coagulated and settled soil is introduced to the hydrocyclone 130 again. Also, the particle size ranges of this invention may be varied if necessary.

Next, if the soil having the particle sizes of more than 0.060 mm to 0.075 mm separated through the hydrocyclone 130 is introduced to the remediating unit 140, the soil is washed with $H_3PO_4$ and is thus remediated (at step S40). At this time, the introducing amounts and concentrations of $H_3PO_4$ are determined upon previously investigated data in Table 2 and Table 3, and they may be varied on the basis of the cumulative data of the acid washing repeatedly conducted later. In this case, if the agitation is performed by means of an agitator (not shown), the working time can be reduced through more rapid action. Also, as shown in FIG.

8, a given target arsenic concentration is set, and only if the arsenic concentration of the acid washed soil is lower than the given target arsenic concentration, the remediated soil can be moved to the filtering step (at step S50).

After that, if the soil washed from the remediating unit 140 is introduced, the soil is dewatered to separately discharge the process water for washing therefrom (at the step S50). The process water for washing conveyed together with the soil on the upper surface of the belt filter of the filtering unit 150 is dewatered by vacuum absorption. At this time, the process water for washing is collected and conveyed to the process water for washing-recycling unit 160.

Next, the process water for washing separately collected in the filtering step (at the step S50) is introduced and purified to the process water for washing-recycling unit 160, and then, the purified water is conveyed to the screen 120 performing the separating step (at step S60). The purification of the process water for washing is conducted through the absorption of the contaminants inclusive of arsenic and lead contained in the process water for washing.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A system for remediating contaminated soil, the system comprising:
   a screen having an input, a silt output and a coarse soil output, the screen accepting contaminated soil at the input and operable to separate, out of the contaminated soil, silt having particle sizes less than a predetermined particle size;
   at least one hydrocyclone having an input connected to the coarse soil output of the screen, said at least one hydrocyclone having a fine soil output and at least one coarse soil output, the fine soil output of said at least one hydrocyclone connected to the input of the screen;
   at least one remediating unit having an input connected to said at least one coarse soil output of said at least one hydrocyclone, said at least one remediating unit eluting soil contaminants by washing with an acid solution including phosphoric acid and having an output;
   a filtering unit having an input connected to the output of said at least one remediating unit, the filtering unit separating process water from soil washed in the remediating unit and having a process water output; and
   a washing-recycling unit having an input connected to the process water output of the output of the filtering unit, the washing-recycling unit absorbing contaminants from the process water to produce treated process water, an output of the washing-recycling unit connected to the screen to supply treated process water to the screen.

2. The system according to claim 1, wherein the contaminated soil is paddy field soil.

3. The system according to claim 1, wherein said at least one hydrocyclone comprises multiple hydrocyclones installed in series.

4. The system according to claim 1, wherein the filtering unit is adapted to discharge the process water from the soil conveyed through a belt filter by means of a vacuum.

5. The system according to claim 1, wherein the contaminants include arsenic and lead, the process water washing-recycling unit comprising an absorber onto which the last said contaminants are absorbed.

6. The system of claim 1, wherein the predetermined particle size is selected from the range of 0.060 mm-0.075 mm.

* * * * *